United States Patent
Bang et al.

(10) Patent No.: US 12,281,910 B2
(45) Date of Patent: Apr. 22, 2025

(54) SYSTEM FOR MODELLING ENERGY CONSUMPTION EFFICIENCY OF AN ELECTRIC VEHICLE AND A METHOD THEREOF

(71) Applicants: HYUNDAI MOTOR COMPANY, Seoul (KR); KIA CORPORATION, Seoul (KR)

(72) Inventors: Jung Hwan Bang, Seoul (KR); Hyung Seuk Ohn, Seoul (KR); Dong Hoon Jeong, Seongnam-si (KR); Won Seok Jeon, Anyang-si (KR); Ki Sang Kim, Seoul (KR); Byeong Wook Jeon, Seoul (KR); Dong Hoon Won, Suwon-si (KR); Hee Yeon Nah, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/085,208

(22) Filed: Dec. 20, 2022

(65) Prior Publication Data
US 2024/0060786 A1 Feb. 22, 2024

(30) Foreign Application Priority Data
Aug. 19, 2022 (KR) .......................... 10-2022-0104238

(51) Int. Cl.
| *B60L 58/13* | (2019.01) |
| *G01C 21/34* | (2006.01) |
| *G01C 21/36* | (2006.01) |

(52) U.S. Cl.
CPC .......... *G01C 21/3469* (2013.01); *B60L 58/13* (2019.02); *G01C 21/3461* (2013.01); *G01C 21/3484* (2013.01); *G01C 21/3617* (2013.01); B60L 2240/70 (2013.01); B60L 2260/54 (2013.01)

(58) Field of Classification Search
CPC .. B60L 58/13; B60L 2240/70; B60L 2260/46; B60L 2260/54; G01C 21/3461; G01C 21/3469; G01C 21/3484; G01C 21/3617
USPC ....... 701/22–27, 29.3, 31.4, 31.5, 32.1, 123, 701/424
See application file for complete search history.

(56) References Cited

U.S. PATENT DOCUMENTS

| 12,104,912 | B2 * | 10/2024 | Konrardy | B60W 30/18163 |
| 2013/0024060 | A1 * | 1/2013 | Sukkarie | H04L 67/12 |
| | | | | 701/22 |
| 2015/0019132 | A1 * | 1/2015 | Gusikhin | G06Q 10/047 |
| | | | | 701/400 |
| 2022/0026228 | A1 * | 1/2022 | Kasioumis | G01C 21/28 |
| 2022/0363140 | A1 * | 11/2022 | Dayal | G01C 21/3469 |

(Continued)

*Primary Examiner* — Erick R Solis
(74) *Attorney, Agent, or Firm* — Lempia Summerfield Katz LLC

(57) ABSTRACT

A system for modeling energy consumption efficiency of an electric vehicle and a method thereof are disclosed. The system includes a communication device that communicates with a plurality of electric vehicles and includes a controller that receives learning data from the plurality of electric vehicles, learns an energy consumption efficiency model based on the received learning data, and transmits the energy consumption efficiency model in which the learning is completed to the plurality of electric vehicles.

10 Claims, 8 Drawing Sheets

(56) References Cited

U.S. PATENT DOCUMENTS

| | | | |
|---|---|---|---|
| 2023/0101183 A1* | 3/2023 | Cella | G01C 21/3407 |
| | | | 701/31.4 |
| 2023/0139003 A1* | 5/2023 | Bhasme | B60L 58/16 |
| | | | 701/533 |
| 2023/0196846 A1* | 6/2023 | Braunstein | G07C 5/006 |
| 2024/0219191 A1* | 7/2024 | Eylander | G01C 21/3453 |
| 2024/0318968 A1* | 9/2024 | Klement | G01C 21/3822 |

* cited by examiner

SYSTEM FOR MODELLING ENERGY CONSUMPTION EFFICIENCY OF AN ELECTRIC VEHICLE AND A METHOD THEREOF

CROSS-REFERENCE TO RELATED APPLICATION

This application claims the benefit of priority to Korean Patent Application No. 10-2022-0104238, filed in the Korean Intellectual Property Office on Aug. 19, 2022, the entire contents of which are incorporated herein by reference.

TECHNICAL FIELD

The present disclosure relates to a technique for optimizing an energy consumption efficiency control factor based on an energy consumption efficiency model of an electric vehicle.

BACKGROUND

In general, the energy consumption efficiency (km/l) of an internal combustion engine vehicle represents the distance (km) that an internal combustion engine vehicle can travel per 1 liter of fuel. The energy consumption efficiency (km/kWh) of an electric vehicle represents the distance (km) that an electric vehicle can travel per 1 kWh of electricity.

The energy consumption efficiency of such an electric vehicle is determined by an energy consumption efficiency control factor corresponding to various input data. To optimize such an energy consumption efficiency control factor, an automaker performs various tests before launching electric vehicles. In this case, the input data includes a vehicle speed, a battery temperature, an accelerator pedal position (APS), a brake pedal position (BPS), a motor torque, and the like. In addition, the control factors include power distribution control factors, such as a power distribution ratio between front and rear wheels, whether a clutch is engaged with front and rear wheels, and the like. The regenerative braking control factor includes a regenerative braking amount and a mechanical braking amount. The thermal management control factor includes a water pump, a compressor, and a three-way valve (a motor coolant valve, an inverter coolant valve, and a battery coolant valve) of a cooling circuit.

For example, a chassis dynamometer for testing that reproduces an actual road load condition is installed in a constant temperature laboratory. In a state where one tester gets on a vehicle on the chassis dynamometer for testing, a drive aid drives the vehicle on the chassis dynamometer for testing in a preset driving mode. When a situation is reached in which the target speed cannot be achieved in a fully charged state (e.g., a situation in which the remaining amount of a battery is less than or equal to a reference value), the test is terminated, and energy consumption efficiency is calculated based on the test result.

Because the energy consumption efficiency of an electric vehicle determined through such a test is not optimized energy consumption efficiency in various test conditions, the accuracy may be lowered in various conditions on an actual road. For this reason, an electric vehicle cannot optimize energy consumption efficiency control factors.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides a system for modeling energy consumption efficiency of an electric vehicle and a method thereof. The system and method are capable of receiving learning data from a plurality of electric vehicles, learning an energy consumption efficiency model based on the received learning data, and transmitting the learned energy consumption efficiency model to the plurality of electric vehicles to update a previously provided energy consumption efficiency model. Thus, it is possible to optimize the energy consumption efficiency control factor of each electric vehicle to improve energy consumption efficiency and the accuracy of the distance to empty (DTE) of each electric vehicle.

The technical problems to be solved by the present disclosure are not limited to the aforementioned problems. Any other technical problems not mentioned herein should be clearly understood from the following description by those having ordinary skill in the art to which the present disclosure pertains. Also, it should be understood that the objects and advantages of the present disclosure may be realized by the units and combinations thereof recited in the claims.

According to an aspect of the present disclosure, a system for modeling energy consumption efficiency of an electric vehicle includes a communication device that communicates with a plurality of electric vehicles. The system also includes a controller that receives learning data from the plurality of electric vehicles, learns an energy consumption efficiency model based on the received learning data, and transmits the energy consumption efficiency model in which the learning is completed to the plurality of electric vehicles.

According to an embodiment, the electric vehicle may update a basic energy consumption efficiency model by using the energy consumption efficiency model in which the learning is completed.

According to an embodiment, the electric vehicle may obtain an energy consumption prediction curve for a preset time by inputting driving data for the preset time to a basic energy consumption efficiency model. The electric vehicle may also determine an energy consumption actual measurement curve for the preset time based on an output current and an output voltage of a battery. The electric vehicle may also determine the driving data for the preset time and the energy consumption actual measurement curve for the preset time as learning data when mean square error (MSE) values of the energy consumption prediction curve and the energy consumption actual measurement curve exceed a threshold value.

According to an embodiment, the driving data may include at least one of an accelerator pedal position (APS), a brake pedal position (BPS), a gear ratio, a vehicle speed, a front clutch state, a rear clutch state, a road gradient, a road curvature, a motor torque, a motor temperature, a battery state of charge (SOC), a temperature of the battery, an outside temperature, a time since departure, a vehicle weight, or a combination thereof.

According to an embodiment, the electric vehicle may obtain an energy consumption prediction curve of a first road section by inputting driving data of the first road section to a basic energy consumption efficiency model. The electric vehicle may also determine an energy consumption actual measurement curve of the first road section based on an output current and an output voltage of a battery. The electric vehicle may also determine the driving data of the first road section and the energy consumption actual measurement curve of the first road section as learning data when MSE values of the energy consumption prediction curve and the energy consumption actual measurement curve exceed a threshold value.

According to another aspect of the present disclosure, a method of modeling energy consumption efficiency of an electric vehicle includes receiving, by a communication device, learning data from a plurality of electric vehicles. The method also includes learning, by a controller, an energy consumption efficiency model based on the received learning data. The method also includes transmitting, by the controller, the energy consumption efficiency model in which the learning is completed to the plurality of electric vehicles.

According to an embodiment, the method may further include updating, by the electric vehicle, a basic energy consumption efficiency model by using the energy consumption efficiency model in which the learning is completed.

According to an embodiment, the receiving of the learning data may include obtaining, by the electric vehicle, an energy consumption prediction curve for a preset time by inputting driving data for the preset time to a basic energy consumption efficiency model. The receiving of the learning data may also include determining, by the electric vehicle, an energy consumption actual measurement curve for the preset time based on an output current and an output voltage of a battery. The receiving of the learning data may also include determining, by the electric vehicle, the driving data for the preset time and the energy consumption actual measurement curve for the preset time as learning data when MSE values of the energy consumption prediction curve and the energy consumption actual measurement curve exceed a threshold value.

According to an embodiment, the receiving of the learning data may include obtaining, by the electric vehicle, an energy consumption prediction curve of a first road section by inputting driving data of the first road section to a basic energy consumption efficiency model. The receiving of the learning data may also include determining, by the electric vehicle, an energy consumption actual measurement curve of the first road section based on an output current and an output voltage of a battery. The receiving of the learning data may also include determining, by the electric vehicle, the driving data of the first road section and the energy consumption actual measurement curve of the first road section as learning data when mean square error (MSE) values of the energy consumption prediction curve and the energy consumption actual measurement curve exceed a threshold value.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
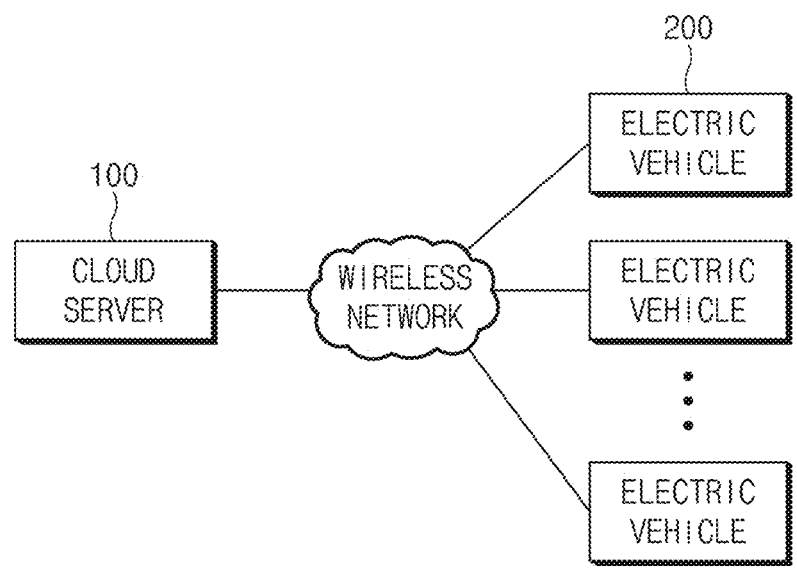
FIG. 1 is a block diagram illustrating a system for modeling energy consumption efficiency of an electric vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configurations or functions have been omitted when it is determined that the related known configurations or functions would interfere with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. Such terms should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a system for modeling energy consumption efficiency of an electric vehicle according to an embodiment of the present disclosure.

As shown in FIG. 1, a system for modeling energy consumption efficiency of an electric vehicle according to an embodiment of the present disclosure may include a cloud server 100 and a plurality of electric vehicles 200.

Regarding each component, the cloud server 100 may be connected to the plurality of electric vehicles 200 through a wireless network. The cloud server 100 may receive learning data from a plurality of electric vehicles, learn an energy consumption efficiency model based on the received learning data, and transmit the learned energy consumption efficiency model to the plurality of electric vehicles. Thus, it is possible to optimize the energy consumption efficiency control factor of each electric vehicle to improve energy consumption efficiency and the accuracy of the distance to empty (DTE) of each electric vehicle. In this case, the energy consumption efficiency model in which the learning is completed may be an energy consumption efficiency model in which the primary learning is completed. The cloud server 100 may continuously learn the energy consumption efficiency model on which the primary learning is completed thereafter.

The cloud server 100 may obtain an optimal parameter set from the energy consumption efficiency model in which learning is completed.

In addition, when the cloud server 100 is provided with a reinforcement learning model in relation to the logic for controlling the driving of the electric vehicle 200, the cloud server 100 may update the policy of the reinforcement learning model based on the energy consumption efficiency model in which learning is completed.

Each electric vehicle 200 may be connected to the cloud server 100 through a wireless network. Each electric vehicle 200 may transmit learning data to the cloud server 100, receive the energy consumption efficiency model in which learning is completed from the cloud server 100, and update the energy consumption efficiency model previously provided with the received energy consumption efficiency model. Thus, it is possible to optimize the energy consumption efficiency control factor to improve the energy consumption efficiency and the accuracy of the DTE of each electric vehicle.

Each electric vehicle 200 may improve the energy consumption efficiency based on the energy consumption efficiency model (an energy consumption efficiency model in which learning is completed) capable of optimizing an energy consumption efficiency control factor. In other words, each electric vehicle 200 may obtain an optimal parameter set from the energy consumption efficiency model in which learning is completed.

In addition, the electric vehicle 200 may obtain an energy consumption prediction curve for a preset time based on the energy consumption efficiency model provided in advance. The electric vehicle 200 may also determine an energy consumption actual measurement curve for the preset time based on an output current and an output voltage of a battery provided therein. When the mean square error (MSE) values of the energy consumption prediction curve and the energy consumption actual measurement curve exceed a threshold value, the electric vehicle 200 may determine the input data for the preset time and the energy consumption actual measurement curve as learning data. In this case, the electric vehicle 200 may include a current sensor and a voltage sensor.

The electric vehicle 200 may obtain an energy consumption prediction curve of a first road section based on the energy consumption efficiency model provided in advance therein. The electric vehicle 200 may also determine an energy consumption actual measurement curve of the first road section based on an output current and an output voltage of a battery provided therein. When the MSE values of the energy consumption prediction curve and the energy consumption actual measurement curve exceed a threshold value, the electric vehicle 200 may determine the input data of the first road section and the energy consumption actual measurement curve as learning data.

Figure 2:
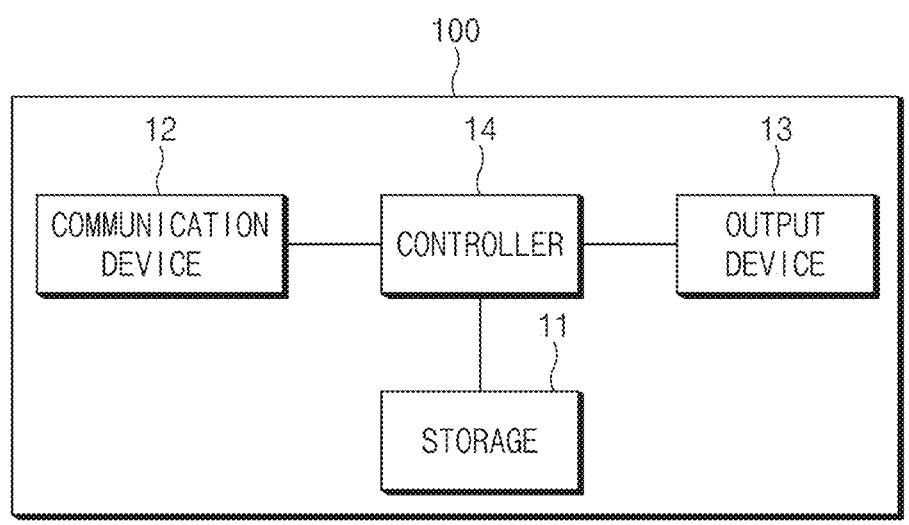
FIG. 2 is a block diagram illustrating a cloud server constituting a system for modeling energy consumption efficiency of an electric vehicle according to an embodiment of the present disclosure.

FIG. 2 is a block diagram illustrating a cloud server constituting a system for modeling energy consumption efficiency of an electric vehicle according to an embodiment of the present disclosure.

As shown in FIG. 2, the cloud server 100 constituting a system for modeling energy consumption efficiency of an electric vehicle according to an embodiment of the present disclosure may include storage 11, a communication device 12, an output device 13, and a controller 14. In this case, depending on a scheme of implementing the cloud server 100 according to an embodiment of the present disclosure, components may be combined with each other to be implemented as one, or some components may be omitted.

Regarding each component, the storage 11 may store various logic, algorithms, and programs required in the processes of receiving learning data from the plurality of electric vehicles 200, learning the energy consumption efficiency model based on the received learning data, and transmitting the energy consumption efficiency model in which learning is completed to the plurality of electric vehicles 200.

The storage 11 may store the latest energy consumption efficiency model in which learning is completed. The energy consumption efficiency model may be implemented as an artificial neural network and may output an energy consumption prediction curve based on various input data (driving data). As an example, the energy consumption efficiency model is as shown in FIG. 3.

Figure 3:
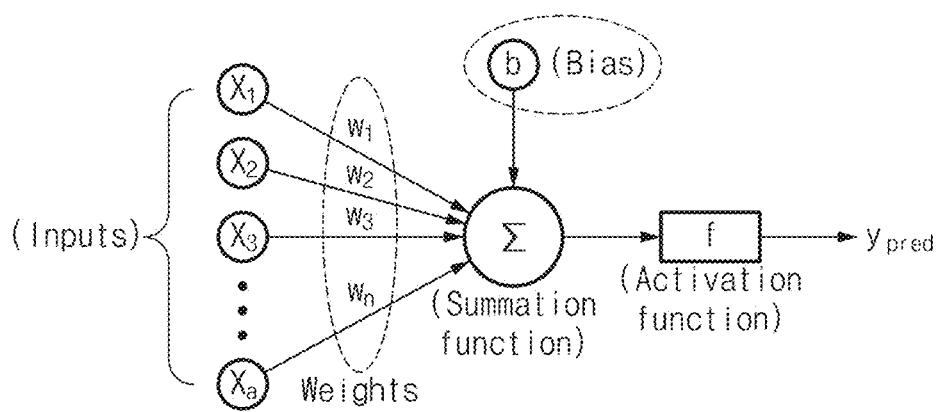
FIG. 3 is a block diagram illustrating an energy consumption efficiency model provided in a system for modeling energy consumption efficiency of an electric vehicle according to an embodiment of the present disclosure.

FIG. 3 is a diagram illustrating an energy consumption efficiency model provided in a system for modeling energy consumption efficiency of an electric vehicle according to an embodiment of the present disclosure.

As shown in FIG. 3, the energy consumption efficiency model may output an energy consumption prediction curve $y_{pred}$ based on various input data x1, x2, x3, ..., xn. In this case, different weights $w_1, w_2, w_3, ..., w_n$ may be given to the input data, and the weighted input data and bias are input to a summation function. The output of the summation function is input to an activation function, and the output of the activation function becomes an energy consumption prediction curve (continuous values).

The storage 11 may include at least one type of a storage medium of memories of a flash memory type, a hard disk type, a micro type, a card type (e.g., a secure digital (SD) card or an extreme digital (XD) card), or the like, a random access memory (RAM), a static RAM, a read-only memory (ROM), a programmable ROM (PROM), an electrically erasable PROM (EEPROM), a magnetic memory (MRAM), a magnetic disk, or an optical disk type memory.

The communication device 12, which is a module that provides a communication interface to a communication device 23 provided in each electric vehicle 200, may include at least one of a mobile communication module, a wireless Internet module, or a short-range communication module.

The mobile communication module may communicate with each electric vehicle 200 through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), or the like).

The wireless Internet module, which is a module for wireless Internet access, may communicate with each electric vehicle 200 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication with each electric vehicle 200 by using at least one of Bluetooth™, radio frequency identification (RFID), infrared data association (IrDA), ultra wideband (UWB), ZigBee, near field communication (NFC), and wireless universal serial bus (USB) technology.

The output device 13 may output, through a screen or voice, the processes of receiving learning data from the plurality of electric vehicles 200, learning the energy consumption efficiency model based on the received learning data, and transmitting the energy consumption efficiency model in which learning is completed to the plurality of electric vehicles 200.

The controller 14 may perform overall control such that each component performs its function. The controller 14 may be implemented in the form of hardware or software or may be implemented in a combination of hardware and software. In an embodiment, the controller 14 may be implemented as a microprocessor but is not limited thereto.

The controller 14 may perform various controls in the processes of receiving the learning data from the plurality of electric vehicles 200, learning the energy consumption efficiency model based on the received learning data, and transmitting the energy consumption efficiency model in which learning is completed to the plurality of electric vehicles 200. In this case, the energy consumption efficiency model in which the learning is completed may be an energy consumption efficiency model in which the primary learning is completed. The controller 14 may continuously learn the energy consumption efficiency model after the primary learning is completed to increase the degree of completion of the energy consumption efficiency model.

Figure 4:
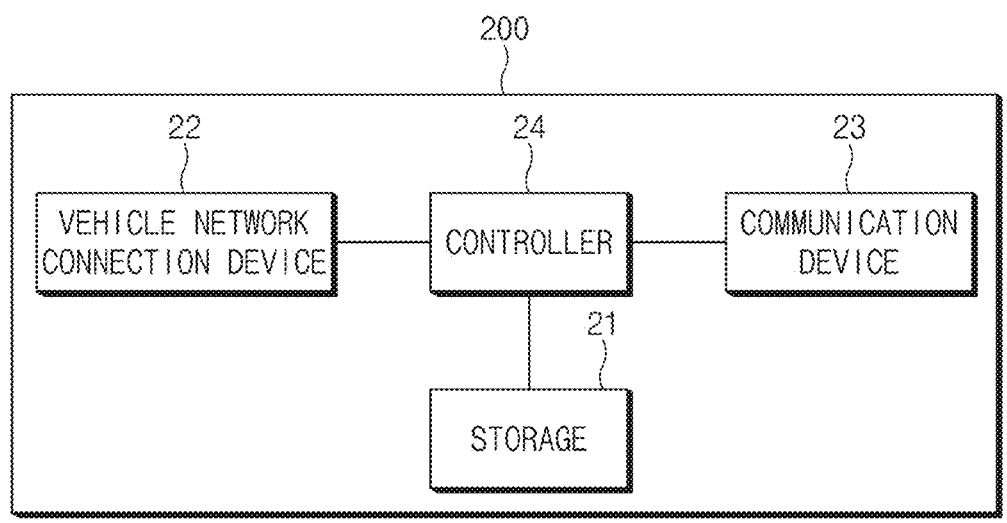
FIG. 4 is a block diagram illustrating an electric vehicle constituting a system for modeling energy consumption efficiency of an electric vehicle according to an embodiment of the present disclosure.

FIG. 4 is a block diagram illustrating an electric vehicle constituting a system for modeling energy consumption efficiency of an electric vehicle according to an embodiment of the present disclosure.

As shown in FIG. 4, the electric vehicle 200 constituting a system for modeling energy consumption efficiency of an electric vehicle according to an embodiment of the present disclosure may include storage 21, a vehicle network connection device 22, the communication device 23, and a controller 24. As another embodiment, a vehicle terminal including the storage 21, the vehicle network connection device 22, the communication device 23, and the controller 24 may be implemented in the form of being mounted on the electric vehicle 200.

Regarding each component, the storage 21 may store various logic, algorithms, and programs required in the processes of transmitting the learning data to the cloud server 100, receiving the energy consumption efficiency model in which learning is completed from the cloud server 100, and updating the energy consumption efficiency model previously provided with the received energy consumption efficiency model.

The storage 21 may store a basic energy consumption efficiency model and thereafter may store the updated energy consumption efficiency model.

The storage 21 may store various logic, algorithms, and programs required in the processes of obtaining the energy consumption prediction curve for the preset time (preset time) based on the basic energy consumption efficiency model, determining the energy consumption actual measurement curve for the preset time based on the output current and the output voltage of the battery provided in the electric vehicle 200, and determining the input data and the energy consumption actual measurement curve for the preset time as learning data when the MSE values of the energy consumption prediction curve and the energy consumption actual measurement curve exceed a threshold value.

The storage 21 may store various logic, algorithms, and programs required in the processes of obtaining the energy consumption prediction curve of the first road section based on the basic energy consumption efficiency model, determining an energy consumption actual measurement curve of the first road section based on the output current and the output voltage of the battery provided in the electric vehicle 200, and determining the input data and the energy consumption actual measurement curve of the first road section as learning data when the MSE values of the energy consumption prediction curve and the energy consumption actual measurement curve exceed a threshold value.

The storage 21 may include at least one type of a storage medium of memories of a flash memory type, a hard disk type, a micro type, a card type (e.g., a secure digital (SD) card or an extreme digital (XD) card), or the like, a random access memory (RAM), a static RAM, a read-only memory (ROM), a programmable ROM (PROM), an electrically erasable PROM (EEPROM), a magnetic memory (MRAM), a magnetic disk, or an optical disk type memory.

The vehicle network connection device 22 may provide a connection interface with a vehicle network. In this case, the internal network of the autonomous vehicle may include a controller area network (CAN), a CAN flexible data-rate (FD), a local interconnect network (LIN), FlexRay, media oriented systems transport (MOST), an Ethernet, or the like.

The communication device 23, which is a module that provides a communication interface to the communication device 12 provided in the cloud server 100, may include at least one of a mobile communication module, a wireless Internet module, or a short-range communication module.

The mobile communication module may communicate with the cloud server 100 through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), or the like).

The wireless Internet module, which is a module for wireless Internet access, may communicate with the cloud server 100 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication with the cloud server 100 by using at least one of Bluetooth™, radio frequency identification (RFID), infrared data association (IrDA), ultra wide-band (UWB), ZigBee, near field communication (NFC), or wireless universal serial bus (USB) technology.

The controller 24 may perform overall control such that each component performs its function. The controller 24 may be implemented in the form of hardware or software or may be implemented in a combination of hardware and software. In an embodiment, the controller 24 may be implemented as a microprocessor but is not limited thereto. For example, the controller 24 may be implemented with a vehicle control unit (VCU).

Specifically, the controller 24 may perform various controls in the processes of transmitting the learning data to the cloud server 100, receiving the energy consumption efficiency model in which learning is completed from the cloud server 100, and updating the energy consumption efficiency model previously provided with the received energy consumption efficiency model.

The controller 24 may obtain the energy consumption prediction curve for the preset time based on the basic energy consumption efficiency model. The controller 24 may also determine the energy consumption actual measurement curve for the preset time based on the output current and the output voltage of the battery provided in the electric vehicle 200. The controller 24 may also determine the input data and the energy consumption actual measurement curve for the preset time as learning data when the MSE values of the energy consumption prediction curve and the energy consumption actual measurement curve exceed a threshold value.

The controller 24 may obtain an energy consumption prediction curve of a first road section based on the basic energy consumption efficiency model. The controller 24 may also determine an energy consumption actual measurement curve of the first road section based on the output current and the output voltage of the battery provided in the electric vehicle 200. The controller 24 may also determine the input data and the energy consumption actual measurement curve of the first road section as learning data when the MSE values of the energy consumption prediction curve and the energy consumption actual measurement curve exceed a threshold value.

The controller 24 may improve the energy consumption efficiency based on the energy consumption efficiency model (the energy consumption efficiency model in which learning is completed) capable of optimizing an energy consumption efficiency control factor. In other words, each controller 24 may obtain an optimal parameter set from the energy consumption efficiency model in which learning is completed.

Hereinafter, a process in which the controller 24 obtains learning data is described in detail with reference to FIGS. 5 and 6.

Figure 5:
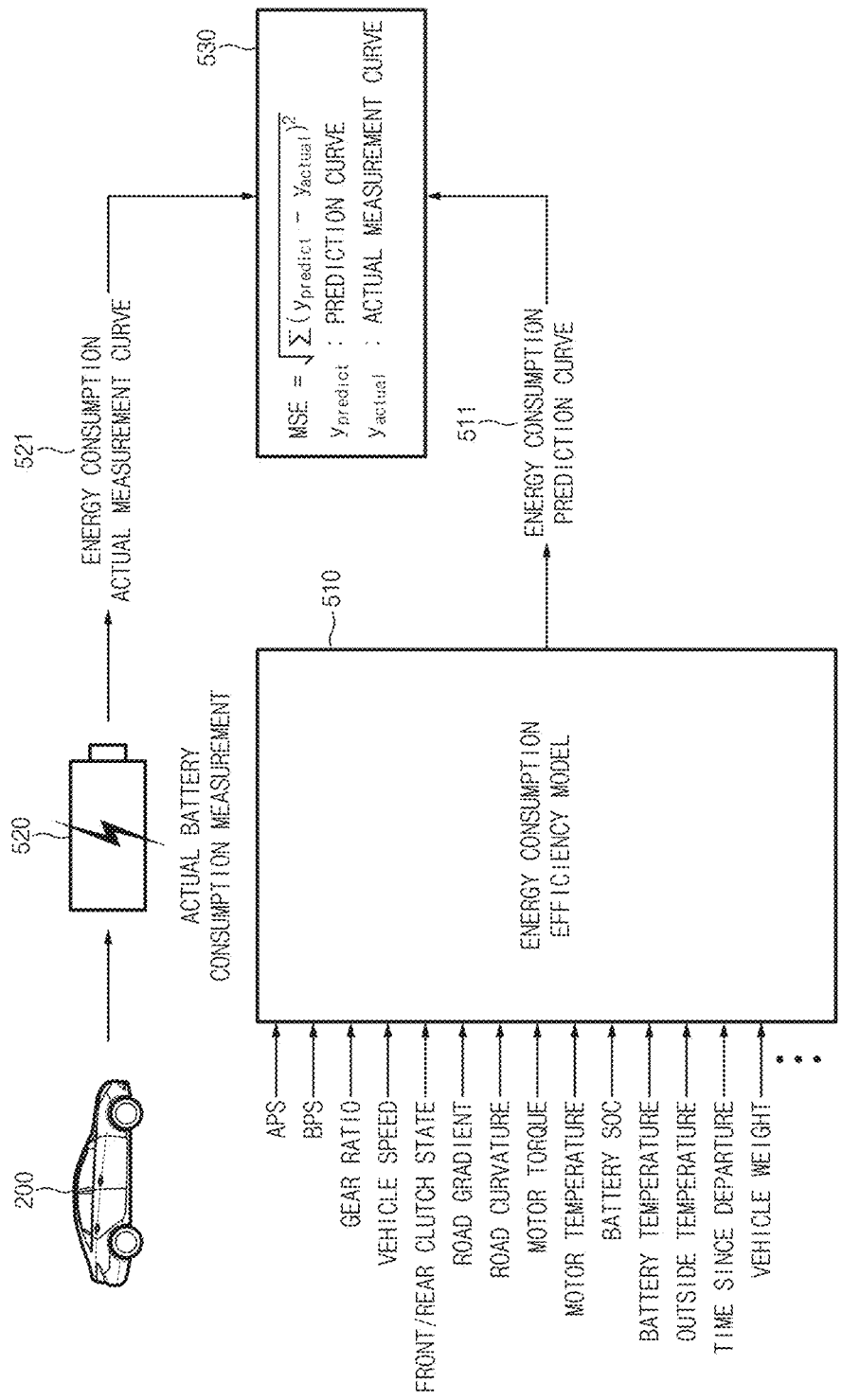
FIG. 5 is a diagram illustrating a process in which a controller provided in an electric vehicle constituting a system for modeling energy consumption efficiency of an electric vehicle according to an embodiment of the present disclosure obtains learning data.

FIG. 5 is a diagram illustrating a process in which a controller provided in an electric vehicle constituting a system for modeling energy consumption efficiency of an electric vehicle according to an embodiment of the present disclosure obtains learning data.

First, in 511, the controller 24 provided in the electric vehicle 200 driving on a real road may obtain the energy consumption prediction curve for the preset time based on an energy consumption efficiency model 510. The controller 24 may collect data input to the energy consumption efficiency model 510 through the vehicle network, such as an accelerator pedal position (APS), a brake pedal position (BPS), a gear ratio, a vehicle speed, a front/rear clutch state, a road gradient, a road curvature, a motor torque, a motor temperature, a battery state of charge (SOC), a battery temperature, an outside temperature, time since departure, a vehicle weight, and the like. In this case, the vehicle weight may be estimated based on the acceleration of the vehicle relative to the output of the motor.

In 511, the controller 24 may determine the energy consumption actual measurement curve for the preset time based on the output current and the output voltage of a battery 520 provided in the electric vehicle 200.

In 530, the controller may determine the MSE values of the energy consumption prediction curve and the energy consumption actual measurement curve.

When the MSE value exceeds a threshold value, the controller 24 may determine the input data for the preset time and the energy consumption actual measurement curve for the preset time as learning data. In this case, for example, the controller 24 may determine the MSE values of the energy consumption prediction curve and the energy consumption actual measurement curve based on following Equation 1.

$$\text{MSE} = \sqrt{\Sigma(y_{predict} - y_{actual})^2} \quad \text{[Equation 1]}$$

In Equation 1, $y_{predict}$ denotes an energy consumption prediction curve (value) and $y_{actual}$ denotes an energy consumption actual measurement curve (value).

As another example, in 511, the controller 24 provided in the electric vehicle 200 driving on a real road may obtain the energy consumption prediction curve of the first road section based on the energy consumption efficiency model 510. The controller 24 may collect driving data input to the energy consumption efficiency model 510 through the vehicle network, such as an accelerator pedal position (APS), a brake pedal position (BPS), a gear ratio, a vehicle speed, a front/rear clutch state, a road gradient, a road curvature, a motor torque, a motor temperature, a battery state of charge (SOC), a battery temperature, an outside temperature, time since departure, a vehicle weight, and the like. In this case, the vehicle weight may be estimated based on the acceleration of the vehicle relative to the output of the motor.

In 511, the controller 24 may determine the energy consumption actual measurement curve of the first road section based on the output current and the output voltage of the battery provided in the electric vehicle 200.

In 530, the controller 24 may determine the MSE values of the energy consumption prediction curve and the energy consumption actual measurement curve.

When the MSE values of the energy consumption prediction curve and the energy consumption actual measurement curve exceed a threshold value, the controller 24 may determine the input data for the preset time and the energy consumption actual measurement curve for the preset time as the learning data. In this case, for example, the controller 24 may determine the MSE values of the energy consumption prediction curve and the energy consumption actual measurement curve based on Equation 1.

Figure 6:
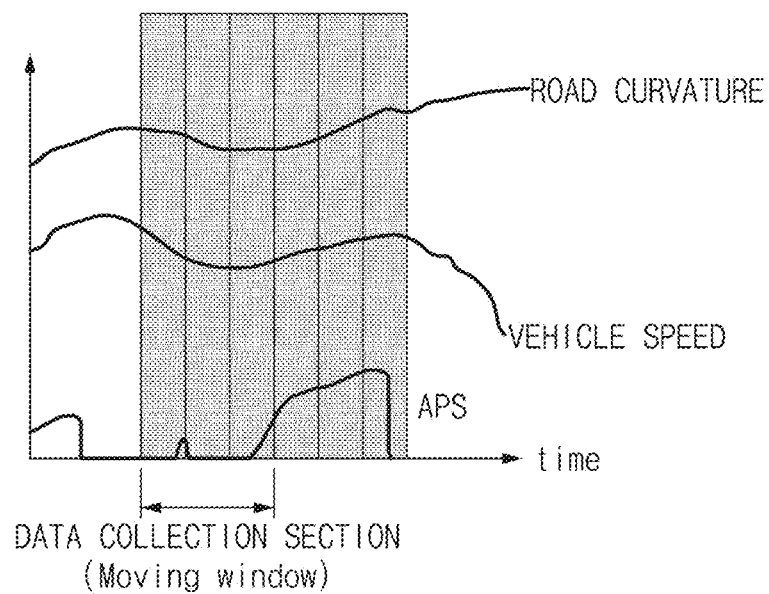
FIG. 6 is a diagram illustrating a section in which a controller provided in an electric vehicle constituting a system for modeling energy consumption efficiency of an electric vehicle according to an embodiment of the present disclosure collects input data.

FIG. 6 is a diagram illustrating a section in which a controller provided in an electric vehicle constituting a system for modeling energy consumption efficiency of an electric vehicle according to an embodiment of the present disclosure collects input data.

As shown in FIG. 6, the controller 24 provided in an electric vehicle constituting a system for modeling energy consumption efficiency of an electric vehicle according to an embodiment of the present disclosure may collect the input data (driving data) in a data collection section (during the preset time period or the first road section) by using a moving window.

Figure 7:
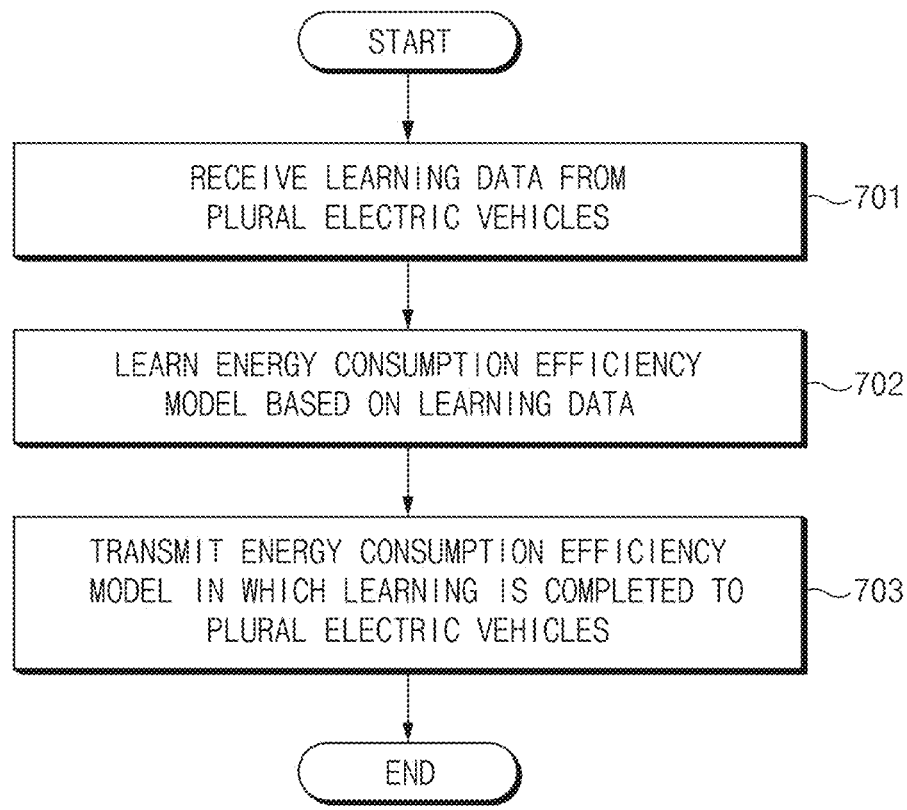
FIG. 7 is a flowchart illustrating a method of modeling energy consumption efficiency of an electric vehicle according to an embodiment of the present disclosure.

FIG. 7 is a flowchart illustrating a method of modeling energy consumption efficiency of an electric vehicle according to an embodiment of the present disclosure.

First, in 701, the communication device 12 receives learning data from the plurality of electric vehicles 200.

In 702, the controller 14 learns the energy consumption efficiency model based on the received learning data. Through the learning process, the parameter set of the energy consumption efficiency model is optimized.

In 703, the controller 14 transmits the learned energy consumption efficiency model to the plurality of electric vehicles 200. Then, the plurality of electric vehicles 200 updates the basic energy consumption efficiency model stored in the storage 21 by using the energy consumption efficiency model on which the learning is completed. In other words, the plurality of electric vehicles 200 updates the parameter set of the basic energy consumption efficiency model.

Figure 8:
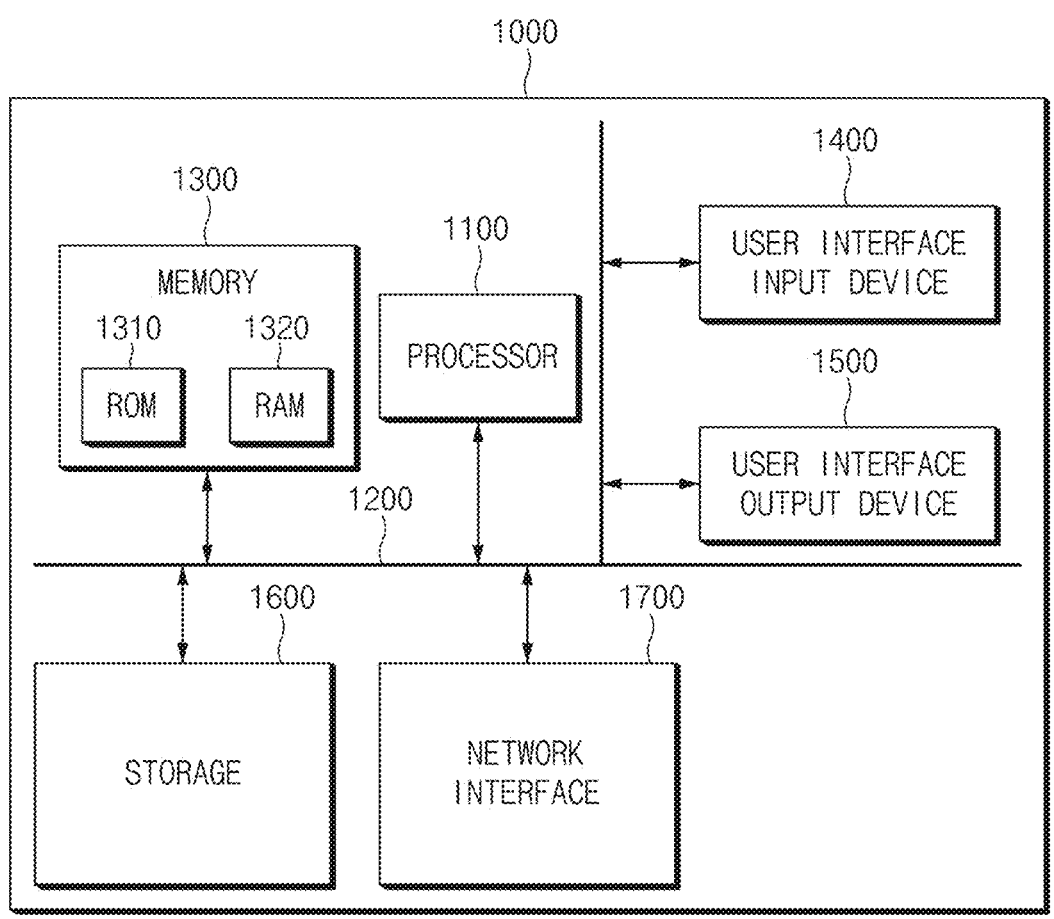
FIG. 8 is a block diagram illustrating a computing system for executing a method of modeling energy consumption efficiency of an electric vehicle according to an embodiment of the present disclosure.

FIG. 8 is a block diagram illustrating a computing system for executing a method of modeling energy consumption efficiency of an electric vehicle according to an embodiment of the present disclosure.

Referring to FIG. 8, a method of modeling energy consumption efficiency of an electric vehicle according to an embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the system for modeling energy consumption efficiency of an electric vehicle and the method thereof of the embodiments, it is possible to optimize the energy consumption efficiency control factor of each electric vehicle to improve energy consumption efficiency and the accuracy of the DTE of each electric vehicle. This is accomplished by receiving learning data from a plurality of electric vehicles, learning an energy consumption efficiency model based on the received learning data, and transmitting the learned energy consumption efficiency model to the plurality of electric vehicles to update a previously provided energy consumption efficiency model.

Although embodiments of the present disclosure have been described for illustrative purposes, those having ordinary skill in the art should appreciate that various modifications, additions, and substitutions are possible, without departing from the scope and spirit of the disclosure.

Therefore, the embodiments disclosed in the present disclosure are provided for the purpose of description, not for limiting the technical concepts of the present disclosure. It should be understood that such embodiments are not intended to limit the scope of the technical concepts of the present disclosure. The scope of protection of the present disclosure should be understood by the claims below, and all the technical concepts within the equivalent scopes should be interpreted to be within the scope of the right of the present disclosure.

What is claimed is:

1. A system for modeling energy consumption efficiency of an electric vehicle, the system comprising:
    a communication device configured to communicate with a plurality of electric vehicles; and
    a controller configured to receive learning data from the plurality of electric vehicles, learn an energy consumption efficiency model based on the received learning data, and transmit the energy consumption efficiency model in which the learning is completed to the plurality of electric vehicles,
    wherein the electric vehicle is configured to:
        obtain an energy consumption prediction curve for a preset time by inputting driving data for the preset time to a basic energy consumption efficiency model;
        determine an energy consumption actual measurement curve for the preset time based on an output current and an output voltage of a battery; and
        determine the driving data for the preset time and the energy consumption actual measurement curve for the preset time as learning data when mean square error (MSE) values of the energy consumption prediction curve and the energy consumption actual measurement curve exceed a threshold value.

2. The system of claim 1, wherein the electric vehicle is configured to update a basic energy consumption efficiency model by using the energy consumption efficiency model in which the learning is completed.

3. The system of claim 1, wherein the driving data includes at least one of an accelerator pedal position (APS), a brake pedal position (BPS), a gear ratio, a vehicle speed, a front clutch state, a rear clutch state, a road gradient, a road curvature, a motor torque, a motor temperature, a battery state of charge (SOC), a temperature of the battery, an outside temperature, a time since departure, a vehicle weight, or a combination thereof.

4. The system of claim 1, wherein the electric vehicle is configured to:
    obtain an energy consumption prediction curve of a first road section by inputting driving data of the first road section to a basic energy consumption efficiency model;
    determine an energy consumption actual measurement curve of the first road section based on an output current and an output voltage of a battery; and determine the driving data of the first road section and the energy consumption actual measurement curve of the first road section as learning data when MSE values of the energy consumption prediction curve and the energy consumption actual measurement curve exceed a threshold value.

5. The system of claim 4, wherein the driving data includes at least one of an accelerator pedal position (APS), a brake pedal position (BPS), a gear ratio, a vehicle speed, a front clutch state, a rear clutch state, a road gradient, a road curvature, a motor torque, a motor temperature, a battery state of charge (SOC), a temperature of the battery, an outside temperature, a time since departure, a vehicle weight, or a combination thereof.

6. A method of modeling energy consumption efficiency of an electric vehicle, the method comprising:
   receiving, by a communication device, learning data from a plurality of electric vehicles;
   learning, by a controller, an energy consumption efficiency model based on the received learning data; and
   transmitting, by the controller, the energy consumption efficiency model in which the learning is completed to the plurality of electric vehicles,
   wherein the receiving of the learning data includes:
      obtaining, by the electric vehicle, an energy consumption prediction curve for a preset time by inputting driving data for the preset time to a basic energy consumption efficiency model;
      determining, by the electric vehicle, an energy consumption actual measurement curve for the preset time based on an output current and an output voltage of a battery; and
      determining, by the electric vehicle, the driving data for the preset time and the energy consumption actual measurement curve for the preset time as learning data when mean square error (MSE) values of the energy consumption prediction curve and the energy consumption actual measurement curve exceed a threshold value.

7. The method of claim 6, further comprising:
   updating, by the electric vehicle, a basic energy consumption efficiency model by using the energy consumption efficiency model in which the learning is completed.

8. The method of claim 6, wherein the driving data includes at least one of an accelerator pedal position (APS), a brake pedal position (BPS), a gear ratio, a vehicle speed, a front clutch state, a rear clutch state, a road gradient, a road curvature, a motor torque, a motor temperature, a battery state of charge (SOC), a temperature of the battery, an outside temperature, a time since departure, a vehicle weight, or a combination thereof.

9. The method of claim 6, wherein the receiving of the learning data includes:
   obtaining, by the electric vehicle, an energy consumption prediction curve of a first road section by inputting driving data of the first road section to a basic energy consumption efficiency model;
   determining, by the electric vehicle, an energy consumption actual measurement curve of the first road section based on an output current and an output voltage of a battery; and
   determining, by the electric vehicle, the driving data of the first road section and the energy consumption actual measurement curve of the first road section as learning data when MSE values of the energy consumption prediction curve and the energy consumption actual measurement curve exceed a threshold value.

10. The method of claim 9, wherein the driving data includes at least one of an accelerator pedal position (APS), a brake pedal position (BPS), a gear ratio, a vehicle speed, a front clutch state, a rear clutch state, a road gradient, a road curvature, a motor torque, a motor temperature, a battery state of charge (SOC), a temperature of the battery, an outside temperature, a time since departure, a vehicle weight, or a combination thereof.

* * * * *